United States Patent [19]

Matsunaga et al.

[11] Patent Number: 5,907,115
[45] Date of Patent: May 25, 1999

[54] KEYBOARD MUSICAL INSTRUMENT WITH KEYBOARD RANGE INDICATOR

[75] Inventors: Hiroshi Matsunaga; Tatsuya Inaba, both of Hamamatsu; Hiroshi Kitagawa, Iwata; Toshinori Matsuda, Shizuoka-ken, all of Japan

[73] Assignee: Kawai Musical Instruments Manufacturing Co., Ltd., Hamamatsu, Japan

[21] Appl. No.: 08/913,679

[22] PCT Filed: Jan. 17, 1997

[86] PCT No.: PCT/JP97/00079

§ 371 Date: Sep. 18, 1997

§ 102(e) Date: Sep. 18, 1997

[87] PCT Pub. No.: WO97/26645

PCT Pub. Date: Jul. 24, 1997

[30] Foreign Application Priority Data

Jan. 19, 1996 [JP] Japan ................................ 8-026062

[51] Int. Cl.[6] .................................................. G09B 15/02
[52] U.S. Cl. .................. 84/477 R; 84/464 R; 84/464 A; 84/478; 84/482; 84/485 R
[58] Field of Search ............................ 84/464 R, 464 A, 84/470 R, 477 R, 478, 479 R, 479 A, 482, 484, 485 R

[56] References Cited

U.S. PATENT DOCUMENTS 3,837,256  9/1974  Gullickson ................................ 84/478
5,394,784  3/1995  Pierce et al. .......................... 84/464 A
5,656,789  8/1997  Nakada et al. ......................... 84/477 R

FOREIGN PATENT DOCUMENTS

| | | |
|---|---|---|
| 60-111280 | 6/1985 | Japan . |
| 63-12362 | 4/1988 | Japan . |
| 63-21903 | 5/1988 | Japan . |
| 3-89466 | 9/1991 | Japan . |
| 6230773 | 8/1994 | Japan . |
| 7-92965 | 4/1995 | Japan . |
| 7261750 | 10/1995 | Japan . |
| 7334073 | 12/1995 | Japan . |
| 8-76750 | 3/1996 | Japan . |

Primary Examiner—William M. Shoop, Jr.
Assistant Examiner—Marlon T. Fletcher
Attorney, Agent, or Firm—Christie, Parker & Hale, LLP

[57] ABSTRACT

A keyboard musical instrument having a keyboard range display device with which the positions of player's hands or fingers on a keyboard and the keys to be depressed as needed, are visually identified, comprises right hand and left hand range display means for displaying keyboard ranges to be covered by right and left hand fingers, and preferably, note-on position display means. Display data included in play data, is used to turn on each display means. A player immediately and intuitively perceives the range that is defined, so that he can easily move his fingers to correspond with the range. Even when the hands are near each other during a performance, the player can clearly identify the positions of the hands on the keyboard and the fingers to be used for key depression.

20 Claims, 12 Drawing Sheets

FIG. 5

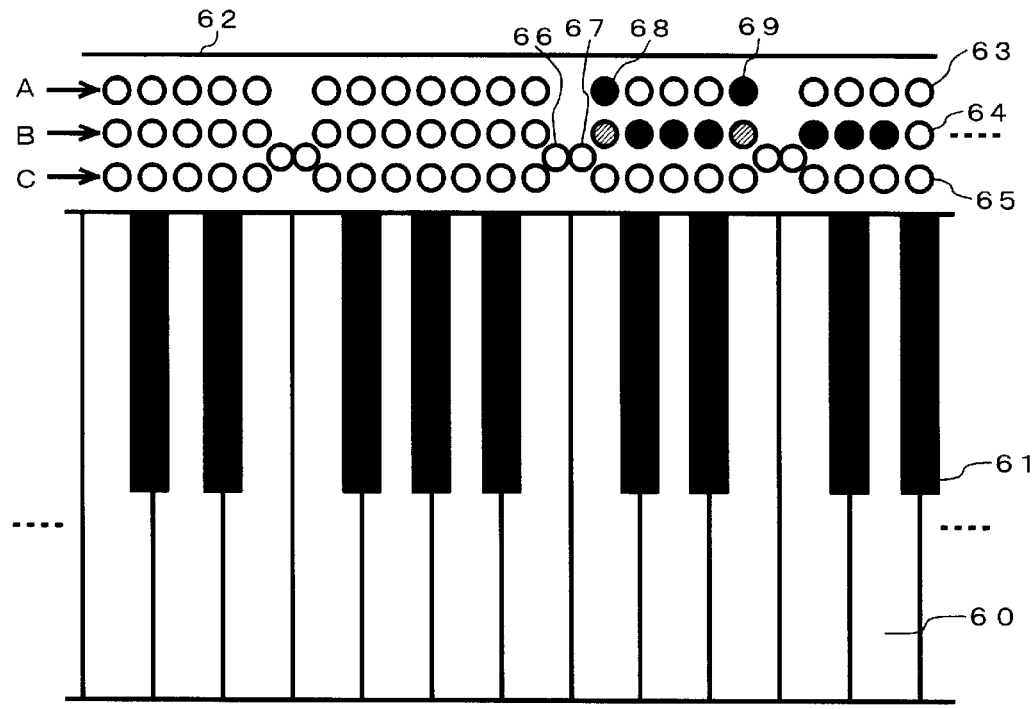

FIG. 6

SPECIAL PLAY DATA

|  | MODE 1 | MODE 2 | MODE 3 | MODE 4 | MODE 5 | REMARKS | |
|---|---|---|---|---|---|---|---|
| TRACK 1 | TONE | TONE | — | — | TONE | FOR RECORD (LEFT) | |
| TRACK 2 | TONE | — | TONE | — | TONE | FOR RECORD (RIGHT) | |
| TRACK 3 | TONE | TONE | — | — | TONE | (LEFT) | PALY INFORMATION |
| TRACK 4 | TONE | — | TONE | — | TONE | (RIGHT) | |
| TRACK 5 | DISPLAY | — | DISPLAY | DISPLAY | — | (LEFT) | GUIDE INFORMATION |
| TRACK 6 | DISPLAY | DISPLAY | — | DISPLAY | — | (RIGHT) | |

FIG. 7

PLAY DATA

|  | MODE 1 | MODE 2 | MODE 3 | MODE 4 | MODE 5 |
|---|---|---|---|---|---|
| TRACK 1 | TONE, DISPLAY | TONE | DISPLAY | DISPLAY | TONE |
| TRACK 2 | TONE, DISPLAY | DISPLAY | TONE | DISPLAY | TONE |
| TRACK 3 | TONE, DISPLAY | TONE | DISPLAY | DISPLAY | TONE |
| TRACK 4 | TONE, DISPLAY | DISPLAY | TONE | DISPLAY | TONE |

FIG. 8
| SECOND BYTE (aa) | THIRD BYTE (bb) |
|---|---|
| 0 0 | bb = NOTE NUMBER OF LOWER FINGERING LIMIT |
| 0 1 | bb = NOTE NUMBER OF UPPER FINGERING LIMIT |
| 0 2 | bb = 127 : DAMPER PEDAL GUIDE ON |
| | bb = 00 : DAMPER PEDAL GUIDE OFF |
| 0 3 | bb = 127 : SOFT PEDAL GUIDE ON |
| | bb = 00 : SOFT PEDAL GUIDE OFF |
| 21～108 (NOTE NUMBER) | bb ≠ 00 : NOTE GUIDE ON |
| | bb = 00 : NOTE GUIDE OFF |
FIG. 9
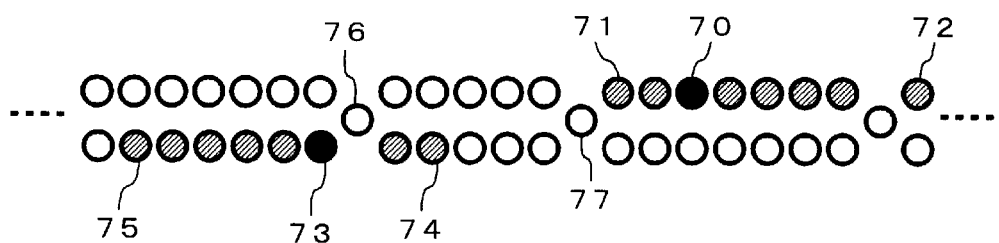
FIG. 10
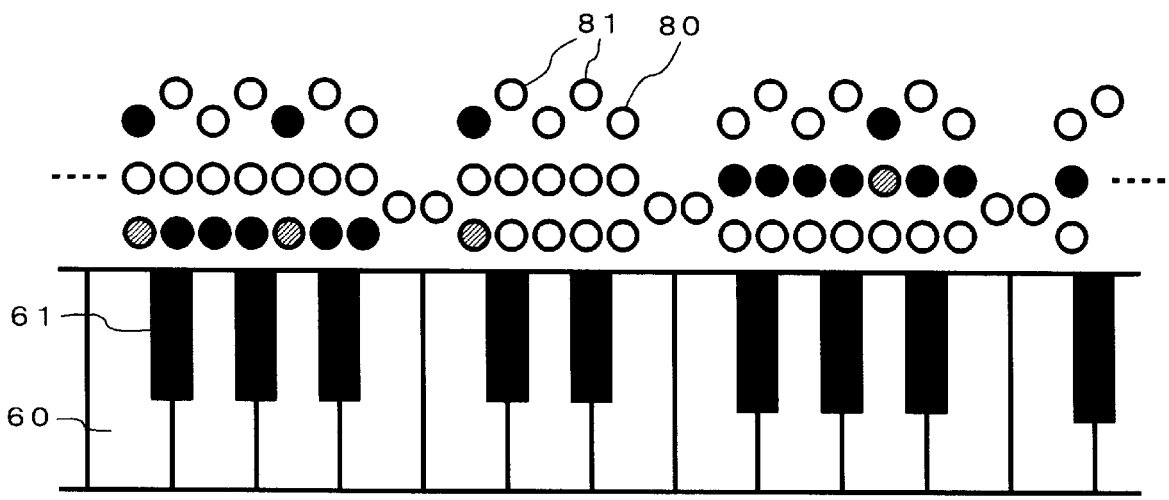

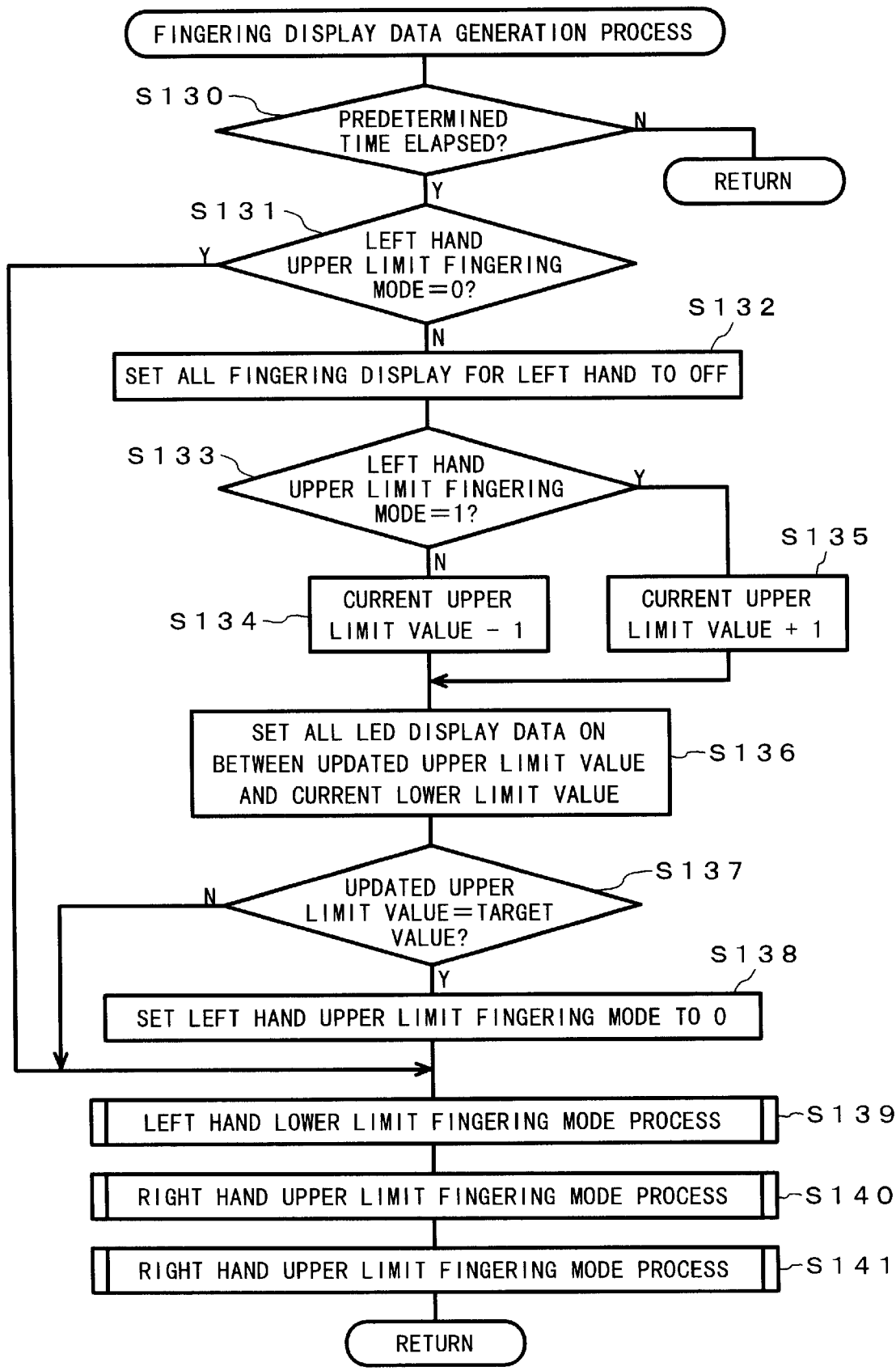

KEYBOARD MUSICAL INSTRUMENT WITH KEYBOARD RANGE INDICATOR

TECHNICAL FIELD

The present invention generally relates to a keyboard musical instrument, and in particular, to a keyboard musical instrument having a keyboard range display device for displaying the positions of player's fingers or hands on a keyboard and, as needed, for displaying a note-on position during a performance.

BACKGROUND ART

As is disclosed in, for example, Japanese Patent Publication No. Sho 63-21903, some conventional keyboard musical instruments, such as pianos and electronic pianos, have indicators on the surfaces of keys, or near the keys, to display a note-on position and the type of the note based on the play data. Such a note-on instruction device is so designed that an indicator is ON at a position of a key to be depressed at a key-on time, or that after a preceding key was depressed, an indicator at a position of a key to be depressed next is on. In Japanese Utility Model Publication No. Sho 63-12362 is disclosed a technique whereby a numerical sign indicator is provided for each key to display a numerical sign representative of a finger for key depression. In addition, in Japanese Laid-Open Patent Publication No. Hei 7-334073 is disclosed a technique for using LEDs arranged for individual keys on a keyboard to display the positions of keys to be depressed and the positions of the player's fingers on the keyboard for playing.

A note-on instruction device of a conventional keyboard musical instrument displays a note-on position, a note-on duration and a finger number for key depression; however, when a beginner practices playing a musical instrument while looking at the note-on instruction device, in the course of playing, the player easily tends to delay key depression due to reading characters and numerals displayed or to recognizing the shapes of signs displayed.

When the positions or ranges of the hands are determined on the keyboard, the fingers to be used for key depression must likewise be determined. For a note-on instruction device that does not directly instruct the positions of the hands, however, to determine the hand positions, a player must refer to finger numbers displayed to ascertain which finger should be used for the key depression, and must then move the finger to the position of the key that is to be depressed. The problem that has arisen here, therefore, is that the movement of the hand towards an expected position tends to be delayed. Furthermore, in a conventional example used for displaying the positions of fingers, it is difficult to identify the finger positions when the both hands are located near each other.

DISCLOSURE OF INVENTION

It is, therefore, an object of the present invention to provide a keyboard musical instrument having a keyboard range display device that displays the position for the hand or hands, or fingers on the keyboard and information concerning which fingers are to be used for the key depression, together with the locations of keys to be depressed, in a configuration that enables a player to intuitively perceive the displayed information.

According to the present invention, a keyboard musical instrument comprises range display means for displaying, while the keyboard musical instrument is played, a keyboard range to be covered by fingers of the player, or locations on a keyboard where the hands are to be placed. Further, according to the present invention, right hand range display means for displaying a keyboard range to be covered by a right hand or fingers, and left hand range display means for displaying a keyboard range to be covered by a left hand or fingers, are independently provided to be perceived.

With this arrangement of the present invention, an indicator, for example, is provided for each key. One indicator, lying within a keyboard range to be covered with one hand, is set to a state that differs from the states of the remaining indicators (e.g., blinking), so that a player can immediately and intuitively perceive which range is to be covered, and can easily move his hand to match the range. Thus, when a hand is moved to and positioned over the range indicated on the keyboard, and a key at an indicated note-on location is depressed using the finger that is closest to that location, the correct fingering system can be learned. Since indicators for the positioning of both right and left hands of fingers are independently provided, a player can clearly identify the positioning for each hand and which fingers are to be used to depress keys, even when the both hands are to be located near each other. Since the note-on display and fingering display are independently arranged, the fingering display for the positions of the hands can be shifted in a little advance of a note-on timing in the play data.

BRIEF DESCRIPTION OF DRAWINGS

FIG. 5 is a front view of the arrangement of the guide display device 9 according to the first embodiment of the present invention;

FIG. 6 is a diagram for explaining the contents of individual tracks and a process for special play data;

FIG. 7 is a diagram for explaining the contents of individual tracks and a process for general play data;

FIG. 8 is a diagram for explaining the contents of the second and the third bytes of a display signal;

FIG. 9 is a front view of the arrangement of the guide display device 9 according to the second embodiment of the present invention;

FIG. 10 is a front view of the arrangement of the guide display device 9 according to the third embodiment of;

FIG. 22 is a detailed flowchart for a fingering indication data preparation process at step S23 in FIG. 12.

BEST MODE FOR CARRYING OUT THE INVENTION

Figure 1:
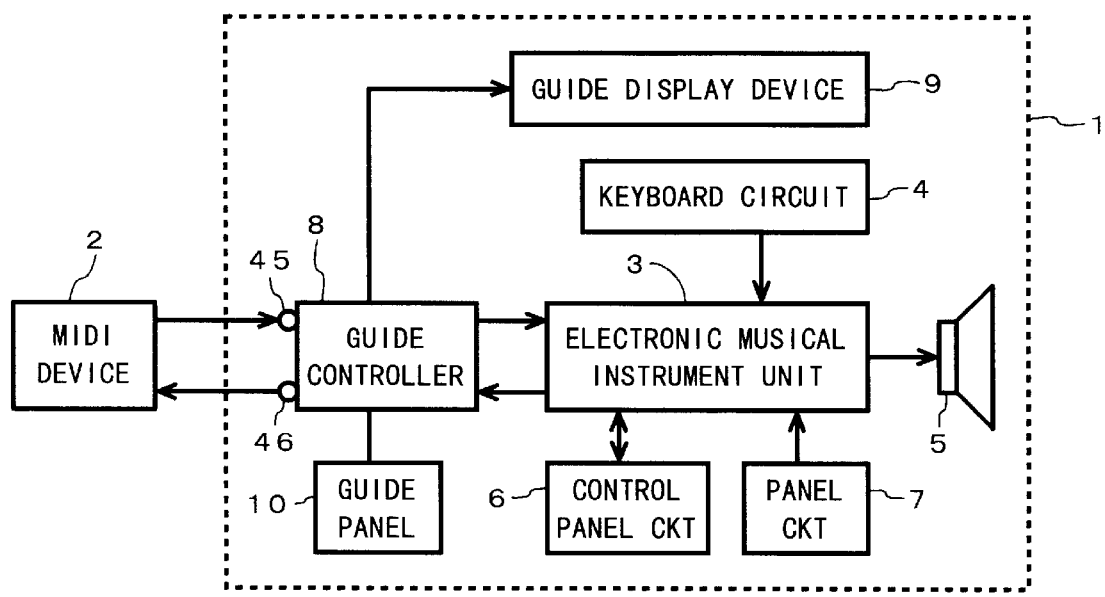
FIG. 1 is a block diagram illustrating the arrangement of a silent piano with a silencing function according to the present invention.

The best modes for the present invention will now be described in detail while referring to the accompanying drawings. FIG. 1 is a block diagram illustrating an embodiment of an electronic piano unit when the present invention is applied to a silent piano having a silencing function. The silent piano having a silencing function is a regular acoustic piano to which has been added a silencing mechanism, which prevents a hammer from striking a string even though a key is depressed, and an electronic piano circuit. This piano can be played in the same manner as is a regular acoustic piano when the silencing mechanism is not active. When the silencing mechanism is active, with this piano the depression of a key is electrically detected by a switch and a musical tone corresponding to the note-on key is electronically generated in the same manner as with a regular electronic piano. Since the silencing mechanism is well known and is described in, for example, Japanese Laid-Open Patent Publication No. Hei 7-92965, no description for it will be given here.

An electronic musical instrument unit 3, a keyboard circuit 4, a loudspeaker or headphone 5, a control panel circuit 6 and a pedal 7 in a piano 1 are usually included in a conventional piano that has a silencing function but that has no note-on instruction device, and these components are well known to one having ordinary skill in the art. Under the control of a CPU, the electronic musical instrument unit 3 scans a note-on signal in the keyboard circuit, and generates a tone signal corresponding to a play operation of a player, as will be described later. The keyboard circuit 4 comprises a set of paired switches that are respectively located under individual keys and rendered on with minute time difference in response to key depression. The electronic musical instrument unit 3 detects the key ON/OFF states in consonance with the changes in the states of the switches, and calculates a note-on velocity by using a time lapse between the rendering on of t he switches in a pair.

The loudspeaker or headphone 5 is use d to release a musical tone that corresponds to a tone signal generated by the electronic musical instrument unit 3. The control panel circuit 6 consists of switches for setting a timbre and a sound effect for an electronic piano, and indicators for displaying the setup condition. The pedal circuit 7 consists of switches connected with a damper pedal and a soft pedal. The above described arrangement and functions are well known to one having ordinary skill in the art.

The guide display device 9 includes a plurality of indicators 63 to 69 that correspond to keys 60 and 61 on a keyboard, as is shown in FIG. 5. A MIDI device 2, which is externally connected to the electronic piano 1, generates play data in real time. A well known device for storing and reading a MIDI file containing play data (music data), and/or a commercially available sequencer for generating a MIDI message in real time, can be used as the MIDI device 2. It is preferable that the MIDI sequencer has the functions for a tempo setup, a temporary halt, a fast forward, repeating, and recording while reproducing. The guide controller 8 drives the guide display device 9 based on the play data that is supplied by the MIDI device 2, and outputs to the electronic musical instrument unit 3 play data to be generated. The guide panel 10 is constituted by a switch circuit for selecting a note-on instruction mode.

Figure 2:
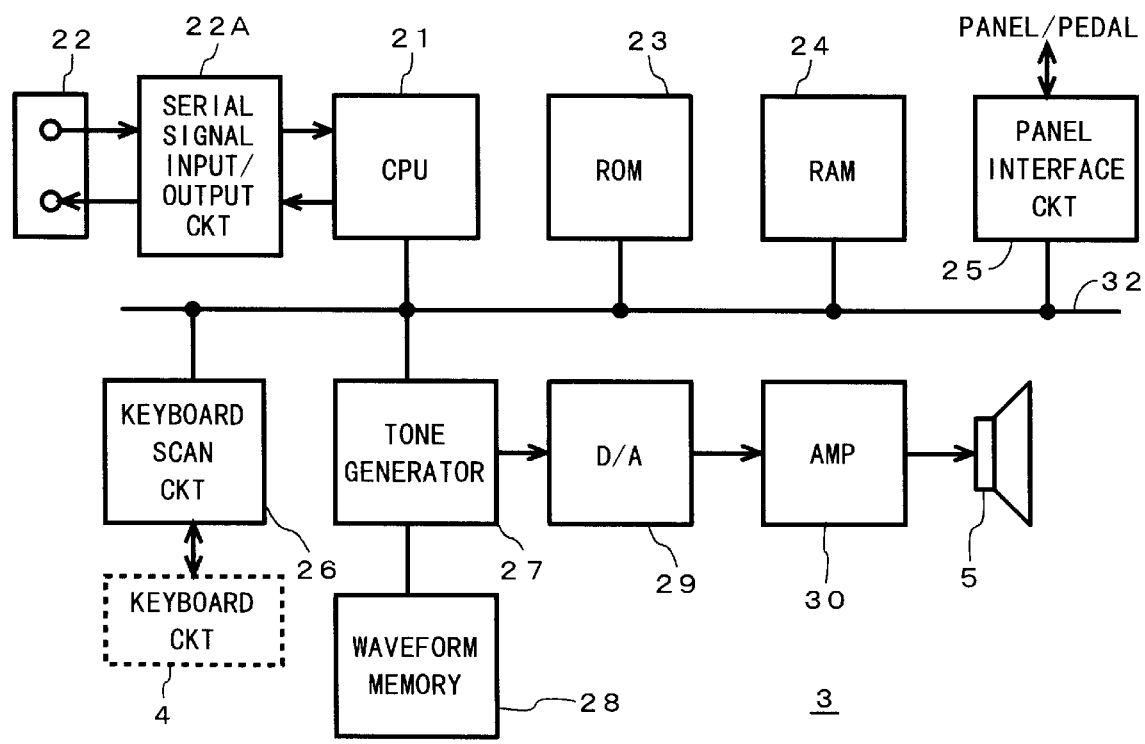
FIG. 2 is a block diagram illustrating the arrangement of an electronic musical instrument 3.

FIG. 2 is a block diagram illustrating the arrangement of the electronic musical instrument unit 3 shown in FIG. 1. A CPU (Central Processing Unit) 21 executes a control program stored in a ROM 23 to provide control for the entire electronic musical instrument unit 3, and incorporates timer circuits that issue interrupts to the CPU at predetermined intervals. A serial signal input/output circuit 22A is provided for the exchange of MIDI signals with the guide controller 8 via a MIDI input/output terminal 22. When a MIDI signal is received or transmitted, it is notified to the CPU by issuing an interrupt signal.

The control program, a timbre parameter and play data are stored in the ROM 23. A RAM 24 is used as a work area and a buffer, and may be backed up by a battery. A panel interface circuit 25 includes timbre and sound effect switches on the panel 6 and interface circuit for the indicators. A keyboard scan circuit 26 scans the paired switches of the keyboard circuit 4 to detect the status changes and the note-on velocities, and transfers the detected information to the CPU 21.

A tone generator 27 generates a tone signal using a waveform reading system, for example. More specifically, the tone generator 27 sequentially reads a tone waveform from a waveform memory, in which is stored digital tone waveform information, at an address interval that is proportional to a pitch to be produced, and performs interpolation to generate a tone waveform signal. The tone generator 27 also has an envelope signal generator (not shown), and multiplies the tone waveform signal by an envelope signal, which is generated based on preset envelope parameters, in order to give an envelope to the tone waveform signal. Thereafter, the tone generator 27 outputs the resultant tone signal. The tone generator 27 includes a plurality of tone generation channels. By activating the tone generation channels in a time sharing manner, a plurality of digital tone signals can be generated simultaneously.

A D/A converter 29 converts a digital tone signal into an analog signal. The analog signal is amplified by an amplifier 30, and the resultant analog signal is released through the loudspeaker or headphone 5 as a musical sound. A bus 32 connects the individual circuits in the electronic musical instrument unit 3 each other. Though not shown, a memory card interface circuit, a floppy disk driver and others may be provided, as needed.

Figure 3:
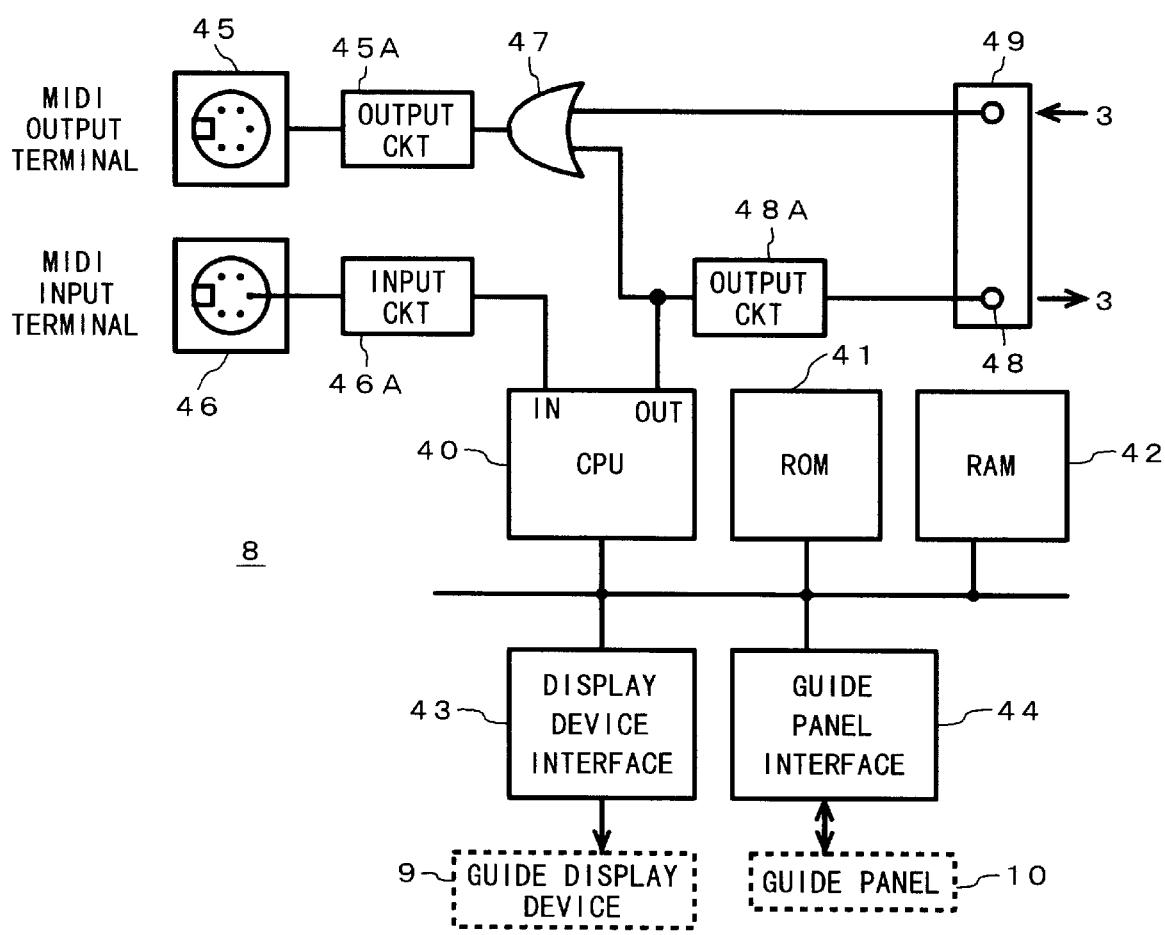
FIG. 3 is a block diagram illustrating the arrangement of a guide controller 8.

FIG. 3 is a block diagram illustrating the arrangement of the guide controller 8 shown in FIG. 1. A CPU 40 executes a control program stored in a ROM 41 to provide control for the entire guide controller 8, and incorporates a timer circuit that issues interrupts to the CPU at predetermined intervals. The CPU 40 further includes a serial signal input circuit 46A for receiving a MIDI message from the external MIDI device 2 at a MIDI input terminal 46, and a serial signal output circuit 48A for outputting a MIDI signal to the electronic musical instrument unit 3 via a MIDI input/output terminal 48. When the MIDI signal is exchanged, it is notified to the CPU by issuing an interrupt signal. An OR circuit 47 acquires a logical sum of a MIDI signal output by the CPU 40 and a MIDI signal output by the electronic musical instrument unit 3, and outputs the logical sum to a MIDI output terminal 45.

In the ROM 41 is stored a control program for performing a process that will be described later. A RAM 42 is used as a work area and a buffer. A display device interface 43 for transmitting display data to the guide display device 9 incorporates a DMA transfer controller. Based on an instruction from the CPU 40, the display device interface 43 sequentially reads display data consisting of a plurality of bytes from a predetermined area of the RAM 42, and outputs the data as a serial signal (SS), and also clock signals (CK) synchronized with each data bit in the serial signal. When the DMA transfer has been completed, an interrupt is issued to the CPU 40 to notify it of the termination of the processing. The display device interface 43 then transmits to the guide display device 9 a signal to latch a display signal. Thereafter, a guide panel interface 44 detects the state of a note-on instruction mode select switch on the guide panel 10, and notifies the CPU 40 of this state. In addition, the guide panel interface 44 displays the current mode information on the guide panel 10.

Figure 4:
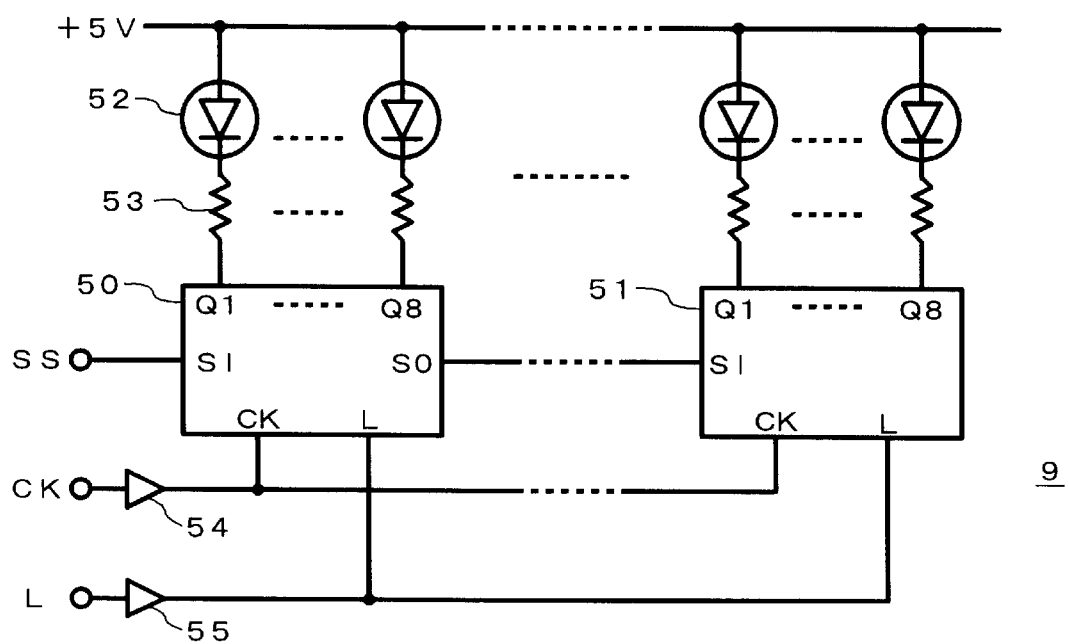
FIG. 4 is a block diagram illustrating the arrangement of a guide display device 9

FIG. 4 is a block diagram illustrating the arrangement of the guide display device 9 in FIG. 1. The guide display device 9 includes a plurality of shift registers (hereinafter referred to as SRs) 50, 51, ..., that are connected in series and that receive display signals SS that are transmitted by the display device interface 43 of the guide controller 8. The SRs 50 and 51 ... are, for example, 8-bit SRs. Serial signals SS, output by the display device interface circuit 43, are received at an input terminal S1 of the SR 50 at the first stage. A series output terminal S0 thereof is connected to an input terminal S1 of the SR at the succeeding stage. Parallel output terminals Q1 to Q8 of the each SR are connected to series circuits, each consisting of a current control resistor 53 and a light emitting diode (LED). As the other terminals of the series circuits are connected to a power source (+5V), when a parallel output terminal is low (0), a corresponding LED is turned on.

A clock signal CK and a latch signal L, which are output by the display device interface circuit 43, are transmitted across receivers 54 and 55 to a clock terminal CK and a latch terminal L of each SR. When a clock pulse is received at the clock terminal CK of the SRs, the contents of the SRs are shifted to the right by one bit. When the latch signal L is high (1), however, the contents of the SRs are not shifted even when the clock CK is input and is latched therein. An example of arrangement for LEDs is shown in FIG. 5. The positional relationship between the parallel output terminals of the SRs and the LEDs connected to the output terminals may be arbitrarily determined by the guide controller 8, when rearranges and transmits display data in consonance with the locations of the LEDs. For example, the SR parallel output terminals arranged from the left may be allocated for the LEDs arranged from the left (see FIG. 5) in order to reduce the length of the wiring.

FIG. 5 is a front view of an example of the guide display device 9 according to the present invention. The guide display device 9 includes a large number of LEDs 63 to 69 that are arranged on a keyboard suppressing member 62, which is located over the rear portion of a keyboard consisting of white keys 60 and black keys 61. The keyboard suppressing member 62 is so disposed over the rear portion of the keyboard that it is inclined backward and it is almost in contact with the upper surface of the keyboard at its front edge. Internally, a cover made of black translucent acrylic plate is attached to the upper portion of a printed wiring board, on which the LEDs 52 and the SRs 50, 51, ..., are provided, so that only light emitting LEDs can be seen by the player.

Three of the LEDs are provided at each position that corresponds to each of the white keys 60 and black keys 61. Basically, as is shown in FIG. 5, 88 LEDs are located, for example, along three lines A, B and C. The LEDs on the upper stage, i.e., on the line A, are those for indicating note-on positions; green, for example, is for a white key, and red is for a black key. The LED is turned on when a corresponding key is to be depressed and is turned off at the time of note off.

The LEDs on the middle stage, i.e., on line B, are orange colored LEDs for indicating a cover range for a right hand, and the LEDs on the lower stage, i.e., on line C, are those for indicating a cover range for a left hand. When the position of displays are changed on lines B and C, the displays are smoothly moved, by a process that will be described later, at a speed that is almost as fast as that of the actual movement of hands in playing the instrument.

In the display on lines B and C, it is preferable that a particular LED corresponding to a key to be depressed be displayed differently from the other LEDs in the same line. For example, the particular LED may blink at a predetermined interval, or its luminance or color may be different from that of others. In FIG. 5, a note-on is indicated by the LEDs 68 and 69 on line A, and eight continuous LEDs (shown solid black and shaded) on line B define a keyboard range to be covered by the right hand or fingers. In addition, the LEDs on line B that correspond to the LEDs 68 and 69 on line A are blinking (shown by shading in FIG. 5).

LEDs 66 and 67 for indicating when a damper pedal or/and a soft pedal are operated are located in areas on the keyboard where there is no black key 61 and two white keys lie adjacent to each other. It is not necessary to provide pedal operation indication LEDs 66 and 67 in all locations where there are no black keys; they may be located at only three areas in a low tone range, a middle tone range and a high tone range of the keyboard. Only a pair of pedal operation display LEDs is sufficient, and even without them, display of fingering may be provided.

FIG. 6 is a table for explaining the contents of individual tracks (MIDI channel) for play data, and a processing for individual modes when special play data, which includes display data for the guide display device according to the present invention, is used for a guide display. As was previously described while referring to FIG. 1, the play data in the MIDI format is reproduced in real time by an external MIDI device 2, such as a sequencer, and the reproduced data are supplied to the electronic piano 1. Data described in remarks in FIG. 6 are stored in the tracks of the play data.

Tracks 1 and 2 are used for the recording of a performance, and no data are stored therein in the initial state. A MIDI message that is play data corresponding to each hand is stored in tracks or channels 3 and 4. Key depression display data and fingering display data corresponding to both hands are stored in tracks 5 and 6. A polyphonic key pressure signal is employed for the display data. This is because a polyphonic key pressure signal is not used in general and because even when many of those signals having arbitrary parameters exist in a specific channel, they do not affect automatic playing. Another MIDI message, or play data in a unique format, may be employed for display.

FIG. 8 is a table for explaining the contents of the second and the third bytes of a polyphonic key pressure signal that is employed for display data in special play data. A polyphonic key pressure signal consists of three bytes. The first byte holds status information representing a polyphonic key pressure signal, and MIDI channel information. The second and the third bytes hold an attribute of display data and an attribute value. When, for example, the second byte of a data is 00, the third byte of the data holds a note number (key number) corresponding to the lower fingering limit. When the second byte is 21 to 108, the second byte value represents a note number. At this time, when the third byte is other than 00, it means that the note guide is to be ON, i.e., that the position of a key to be depressed that is designated by the second byte is displayed. In the MIDI system, usually, the first to the 88th keys of an 88-key piano correspond to note numbers 21 to 108.

Figure 11:
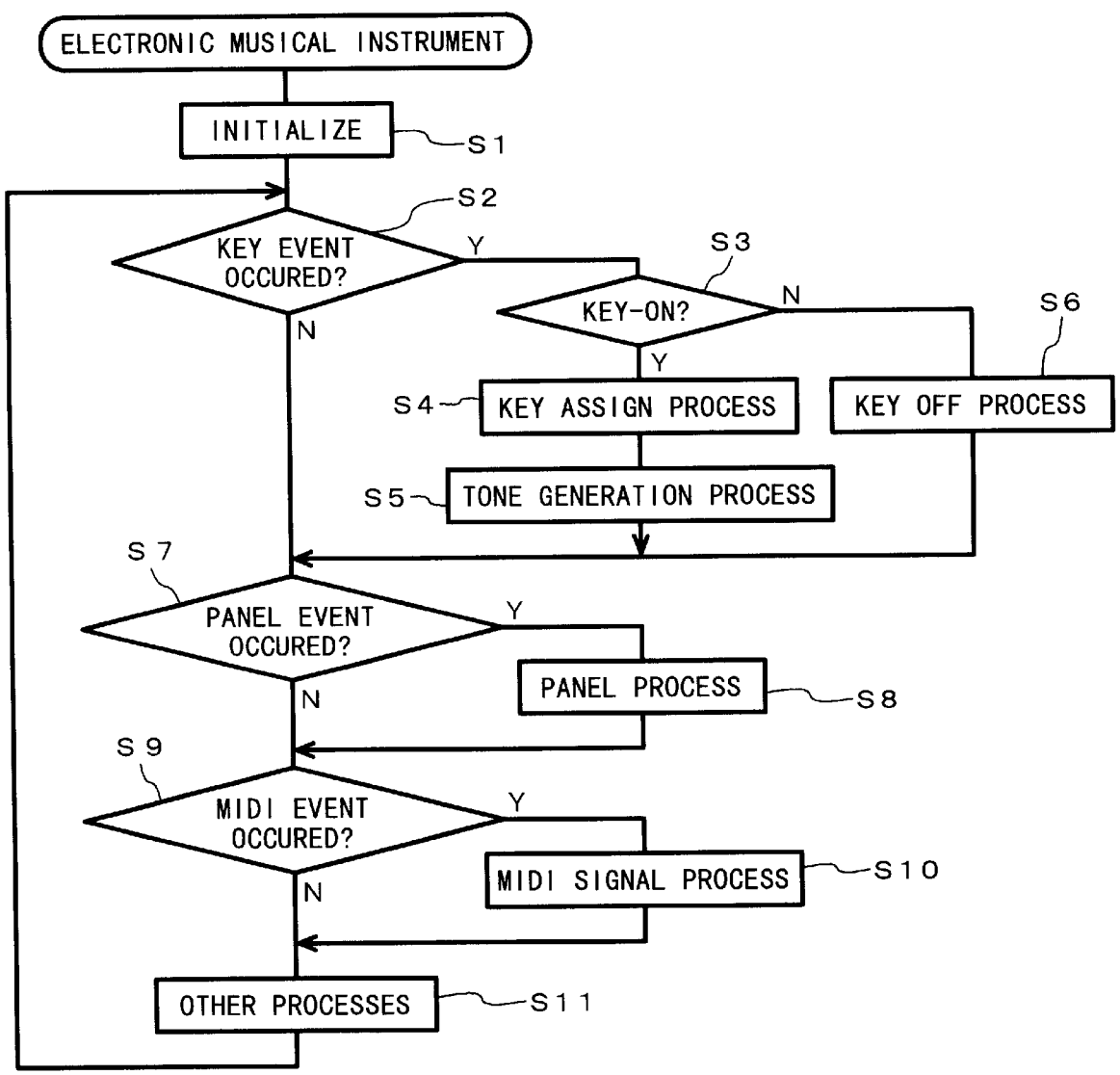
FIG. 11 is a flowchart for the main process performed by an electronic musical instrument 3.

FIG. 11 is the main flowchart for the electronic musical instrument unit 3. When power is ON, at step S1, the tone generator 27 and the data in the RAM 24 are initialized. At step S2, the switch states of the keys on the keyboard are scanned by the keyboard scan circuit 26 to determine whether or not a key event has occurred, i.e., whether the state of a switch corresponding to any key has been changed. When, at step S3, it is found that a key-ON event has occurred, program control moves to step S4 where a key assignment process is performed that assigns the key newly depressed an unused or vacant tone generation channel of the tone generator 27. At step S5, various parameters are set for the assigned channel of the tone generator 27 and tone generation is begun. When a key-OFF event has occurred, program control moves from step S3 to step S6, where a key-OFF process is performed. Upon detection of the key event, a MIDI transmission process corresponding to the key event may also be performed, and, for example, the external MIDI sequencer 2 may record the played data.

At step S7, a check is performed to determine whether or not a panel event has occurred, i.e., whether the states of any of the various switches on the panel has been changed. When a state has been changed, program control goes to step S8, and a panel process is performed in consonance with the event. At step S9, a check is performed to determine whether a MIDI event has occurred, i.e., whether a MIDI message signal has been received. When such a signal has been received, program control moves to step S10, and a MIDI signal process, such as tone generation or a key-OFF event, is performed in the same manner as the process performed in response to the occurrence of a key event. Since an externally received MIDI signal is output to an external output terminal by the guide controller 8, the electronic musical instrument unit 3 does not retransmit the received MIDI signal. At step S11, other processes, such as a sound effect provision process and an automatic playing process, are performed. Since the processing for the electronic musical instrument shown in FIG. 11 is already well known, a further detailed explanation will not be given.

Figure 12:
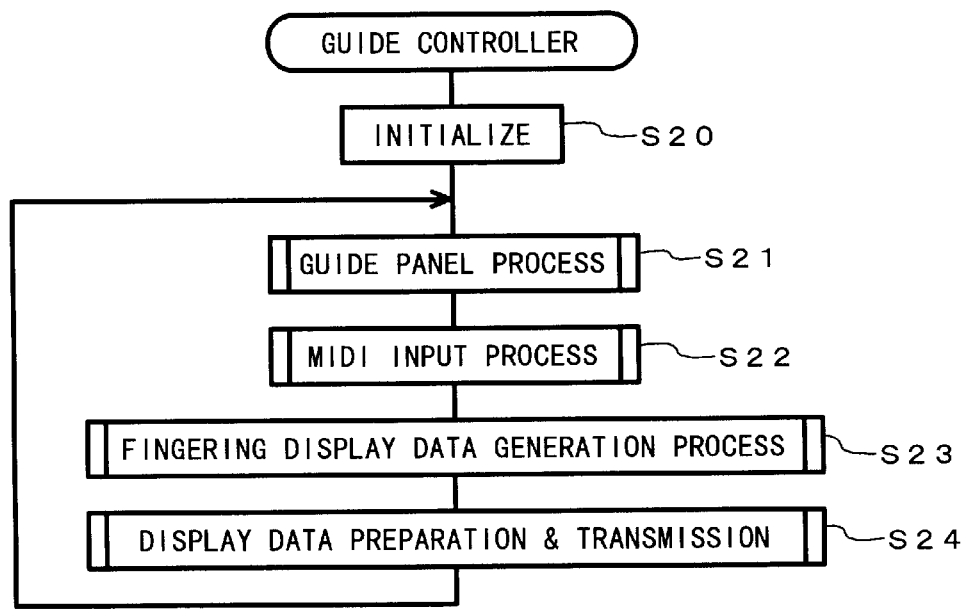
FIG. 12 is a flowchart for the main process performed by the guide controller 8.

FIG. 12 is the main flow chart for the guide controller 8. At step S20, the guide display device 9 and data in the RAM 42 are initialized. At step S21, as will be described later while referring to FIG. 17, the change in the states of the switches on the guide panel 10 for selecting a note-on instruction mode is detected, and a mode update process is performed. At step S22, as will be described later while referring to FIG. 19, when a MIDI signal has been received, MIDI input processing, such as the generation of display data and the transfer of the MIDI signal, is performed. At step S23, as will be described later while referring to FIG. 22, fingering display data for displaying positions for the right and/or the left hands are prepared. At step S24, as will be described later while referring to FIG. 18, display data are prepared and transmitted to the guide display device 9.

Figure 13:
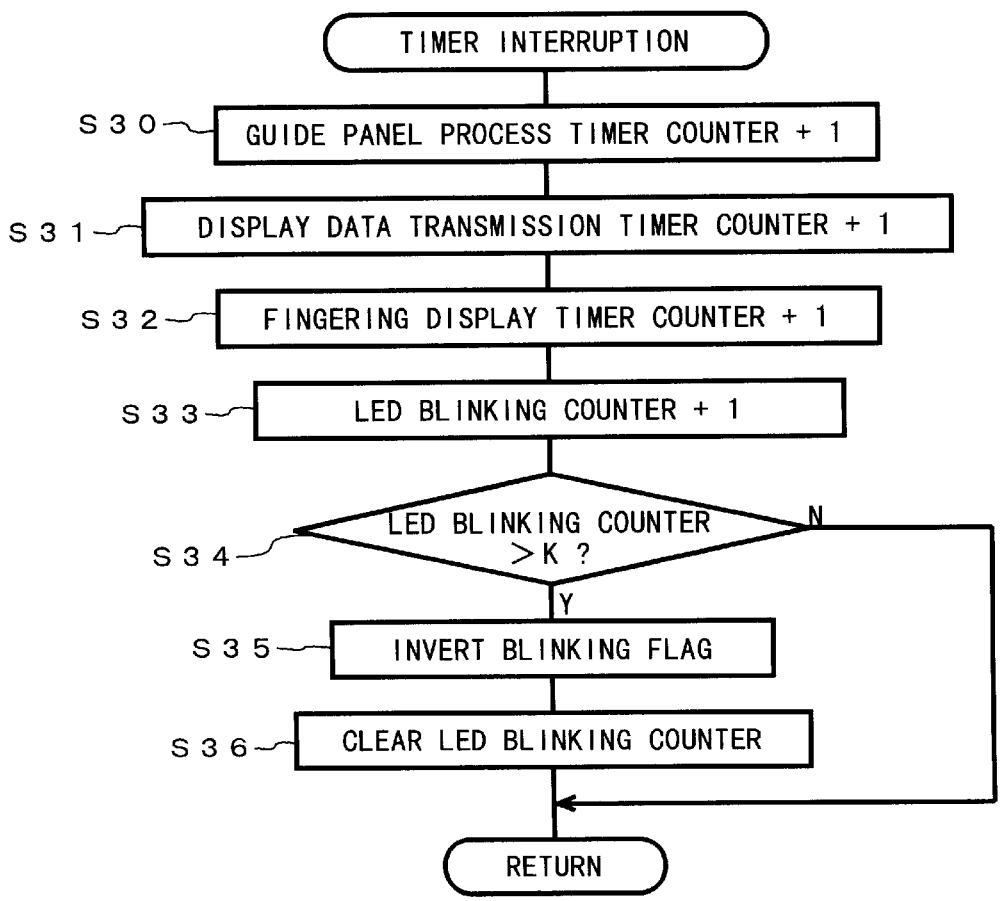
FIG. 13 is a flowchart for a timer interrupt process performed by the guide controller.

FIG. 13 is a flowchart for a timer interrupt process performed by the guide controller 8. The CPU 40 in the guide controller 8 receives a timer interrupt signal from a timer circuit incorporated therein at a predetermined interval. At step S30, a value held in a guide panel process timer counter for determining a guide panel process cycle is incremented by one. At step S31, a value held in a display data transmission timer counter for determining a display data transmission cycle is incremented by one. At step S32, a value held in a fingering display timer counter for determining a fingering display cycle is incremented by one. At step S33, a value held in an LED blinking counter for determining an LED blinking cycle is incremented by one. At step S34, a check is performed to determine whether or not the LED blinking counter value has exceeded a predetermined value K. When the result is affirmative, program control advances to step S35 where a value of a blinking flag is inverted. At step S36, the LED blinking counter is cleared. The value K is preferably determined so that the blinking cycle is several hundreds of milliseconds, for example.

Figure 14:
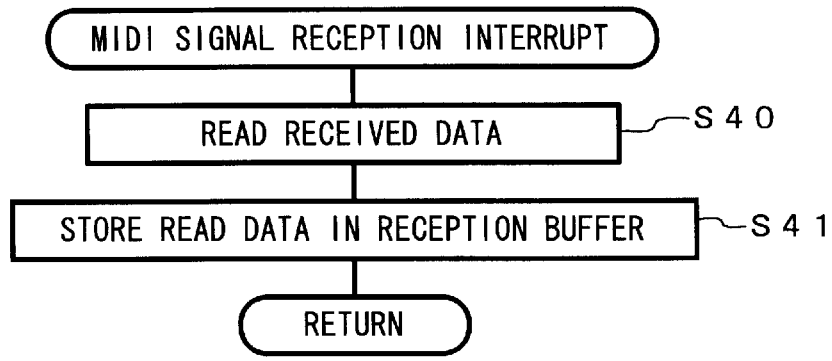
FIG. 14 is a flowchart for a MIDI signal reception interrupt process performed by the guide controller 8.

FIG. 14 is a flowchart for a MIDI signal reception interrupt process performed by the guide controller 8. This process is begun each time one byte of a MIDI signal is received. At step S40, a received MIDI signal is read from a register of the input (reception) circuit 46A. At step S41, the MIDI signal is stored in a reception buffer in the RAM 42.

Figure 15:
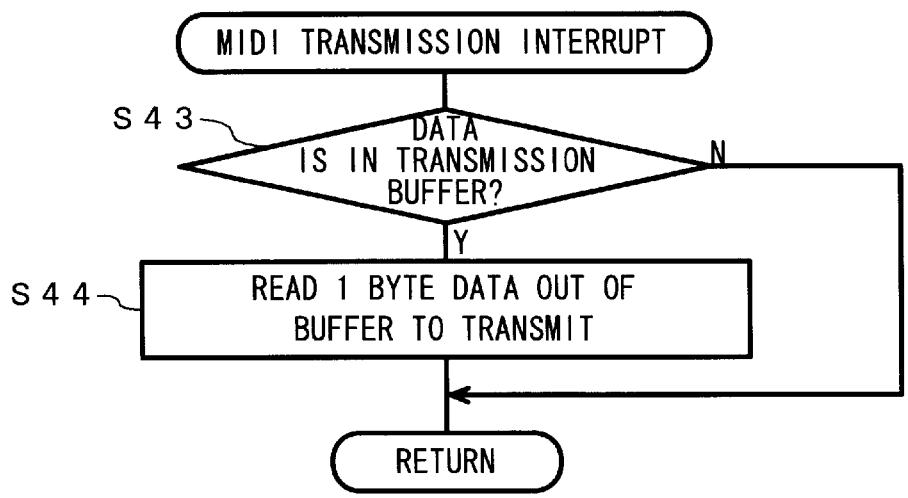
FIG. 15 is a flowchart for a MIDI signal transmission interrupt process performed by the guide controller 8.

FIG. 15 is a flowchart for a MIDI transmission interrupt process performed by the guide controller 8. This process is triggered when a 1-byte MIDI signal has been transmitted. At step S43, a check is performed to determine whether or not data to be transmitted is present in a transmission buffer in the RAM 42. When the result is affirmative, program control goes to step S44, and data equivalent to one byte is extracted from the transmission buffer and transmitted to the output (transmission) circuit 45A. The transmission circuit is then activated to transmit the data.

Figure 16:
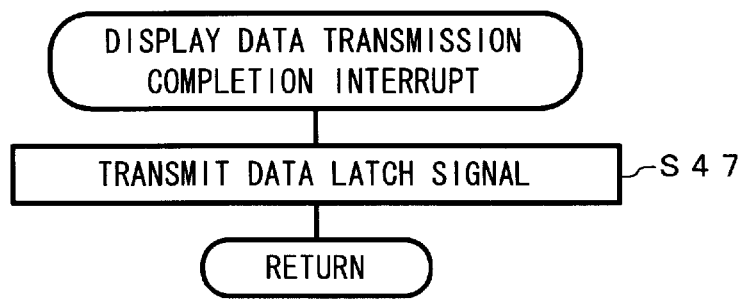
FIG. 16 is a flowchart for a display data transmission completion interrupt process performed by the guide controller 8.

FIG. 16 is a flowchart for a display data transmission completion interrupt process. This process is begun when display data preparation and transmission process (FIG. 18) is completed. At step S47, the CPU 40 transmits a high level transmission data latch signal L through the display device interface 43 to inhibit the shifting of the shift registers 50 and 52 in the guide display device, and to latch data.

Figure 17:
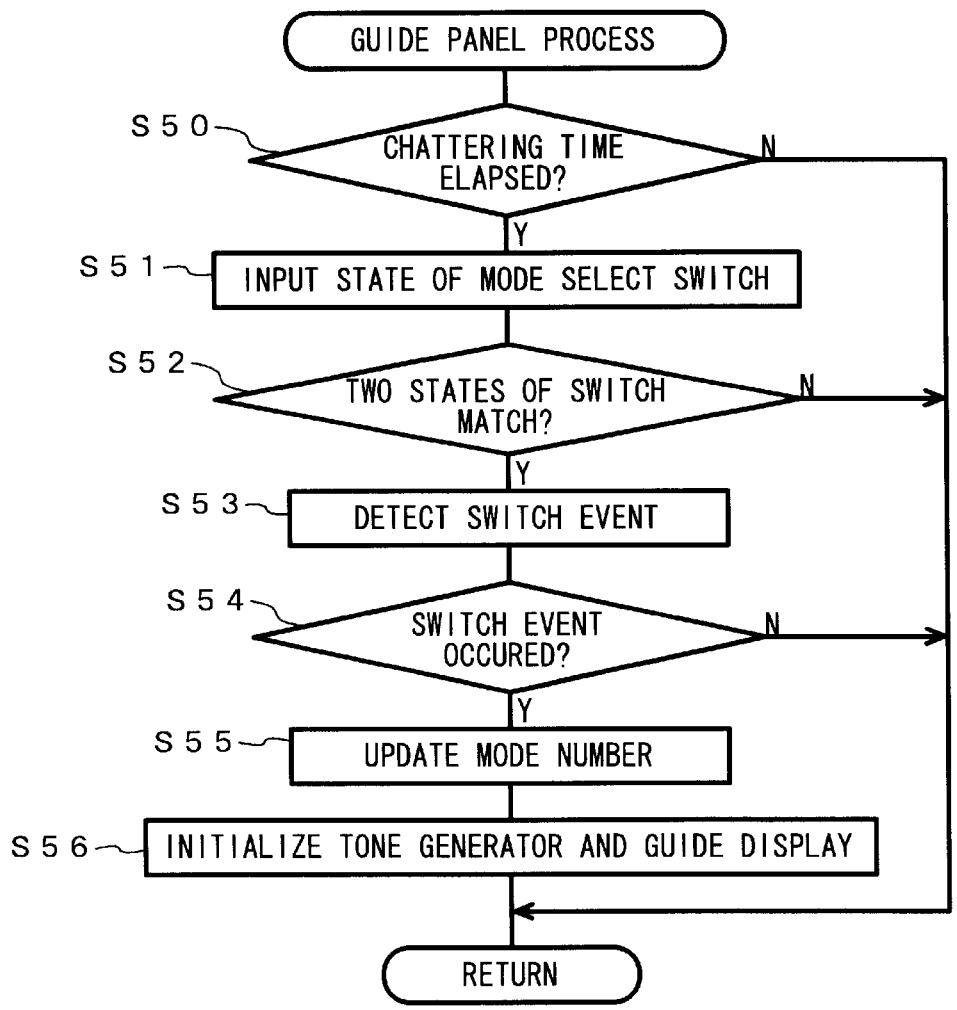
FIG. 17 is a flowchart for a guide panel process at step S21 shown in FIG. 12.

FIG. 17 is a detailed flowchart for the guide panel process (S2) shown in FIG. 12. At step S50, a check is performed to determine whether a count value of the guide panel process timer counter is equal to or greater than a predetermined value. In consonance with the result, whether or not a predicated chattering time for an switch has elapsed is determined. When the result is affirmative, the counter is cleared and program control advances to step S51. At step S51, information concerning the state of the mode select switch on the guide panel 10 is input. At step S52, currently input state information is compared with the preceding input state information to prevent an erroneous operation due to chattering, and it is confirmed that the switch states on two occasions (or more) match each other. When the states do not match, the guide panel process is terminated.

At step S53, to detect a switch event, stored information concerning a current switch state is compared with newly input state information. When, at step S54, it is ascertained that a switch event has occurred, program control advances to step S55. At step S55, a mode number is updated in consonance with the event. At step S56, the tone generator 27 is initialized by transmitting to the electronic musical instrument unit 3 a MIDI signal for initialization of a tone generation process. Also, the guide display data is initialized, and all displays are set to OFF.

Figure 18:
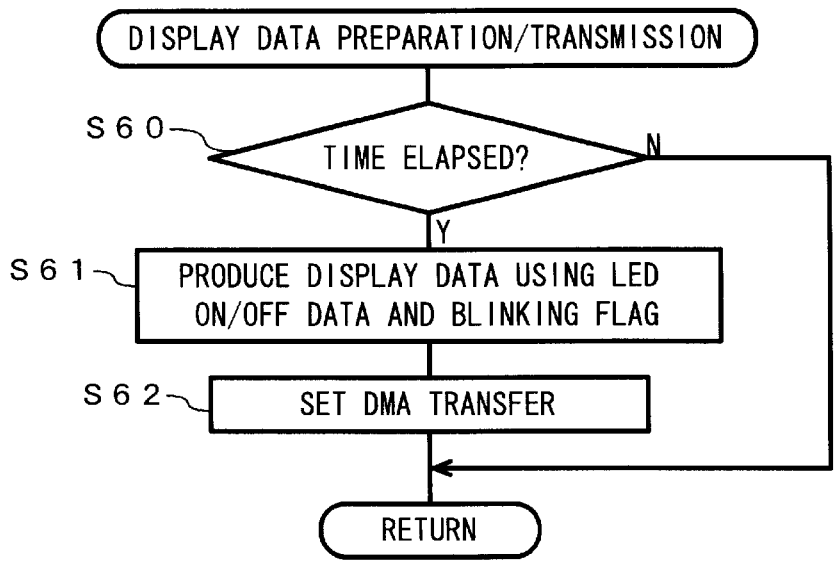
FIG. 18 is a flowchart for a display data preparation and transmission process at step S24 in FIG. 12.

FIG. 18 is a detailed flowchart for the display data preparation and transmission process (S24) in FIG. 12. At step S60, it is determined whether or not a predetermined time has elapsed, by examining a counter value for a display data transmission timer to determine whether it is equal to or greater than a predetermined value. When the result is affirmative, program control advances to step S61 where the counter is first cleared. At step S61, ON/OFF data for a note-on indication LED, a fingering indication LED, and a pedal operation indication LED are employed to produce a logical product of a value of the blinking flag and a data value for the fingering indication LED which corresponds to the note-on indication, so that concerned LED or LEDs are caused to blink. The resultant LED ON/OFF data are then rearranged to correspond with the arrangement order of the LEDs 52 of the guide display device 9 shown in FIG. 4.

At step S62, thus generated display data is stored in a predetermined area of the RAM 42, a latch signal is rendered active low (0) to release the latch of the SRs 50 and 51, and the display device interface 43 is permitted to perform a DMA transfer of the above data. The display device interface 43 reads the display data in proper order from the RAM 42 and transmits it as a serial signal SS to the guide display device 9, as described above. A display may be disturbed during the data transfer, but only for a very short period of time, so that no actual problem occurs.

Figure 19:
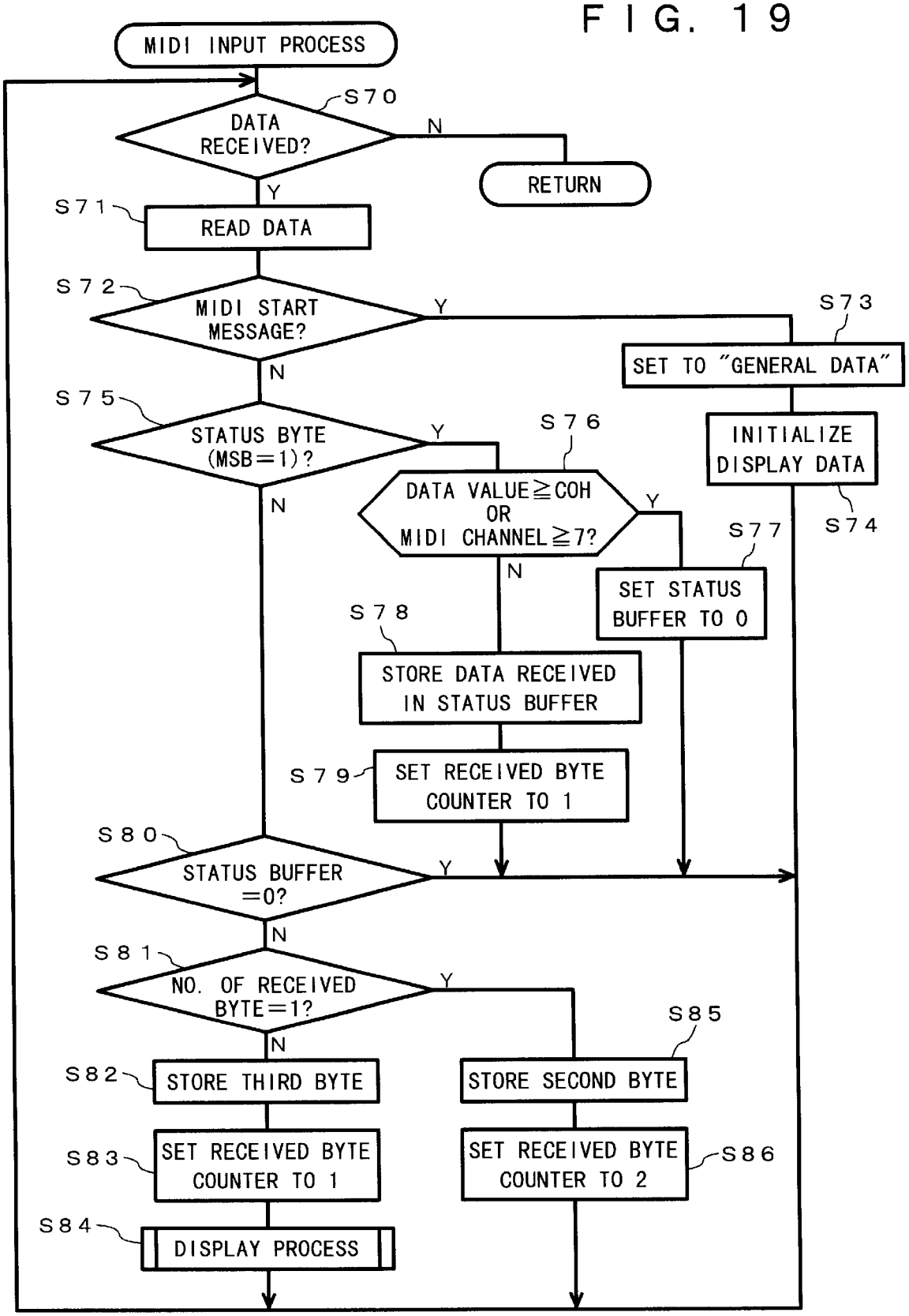
FIG. 19 is a flowchart for a MIDI input process at step S22 shown in FIG. 12.

FIG. 19 is a detailed flowchart for the MIDI input process (S22) in FIG. 12. At step S70, a check is performed to determine whether or not received data is present in the reception buffer. When there is no received data, the processing is terminated. When such data is present, program control moves to step S71 where the data is read from the reception buffer. At step S72, a check is performed to determine whether or not the received data is FAH (H:hexadecimal notation), i.e., a MIDI start message. When the result is affirmative, program control goes to step S73 where the type for the MIDI data is set to "general data." Since the sequencer normally outputs a start message at the beginning of play, the defort value at the beginning of play is set to "general data" by the process at step S73. At step S74, the display data is initialized, i.e., the display data is all set to OFF, and program control thereafter returns to step S70.

When program control moves from step S72 to S75, a check is performed to determine whether or not the received data is a status byte (i.e., MSB=1). When the result is affirmative, program control goes to step S76. A check is then performed to determine whether the data value is C0H or higher, or whether there are seven or more MIDI channels. When the result is affirmative, program control advances to step S77 where the contents of the buffer in which a status byte is stored is set to 0. Program control thereafter returns to step S70. Therefore, the status byte having a value of C0H or higher, or the MIDI message having more than seven MIDI channels, is deleted at this step. Since those information are not generally included in the MIDI signal, however, it does not affect the play. Those data may be handled as a through process. In this specification, "through process" means the transfer of received MIDI data without the performance of any process.

When the decision result at step S76 is negative, at step S78, the received data is stored in the status buffer. At step S79, the value of a received byte counter is set to 1, and program control thereafter returns to step S70.

When the received data is not a status byte, at step S80 a check is performed to determine whether or not the contents of the status buffer is 0. When the result is affirmative, program control returns to step S70. When the result is negative, program control goes to step S81. At step S81, a check is performed to determine whether or not the number of received bytes is 1. When the result is affirmative, program control moves to step S85, where the data at the second byte is stored in the buffer. At step S86, the number of received bytes is set to 2. Program control thereafter returns to step S70.

When the number of received bytes is not 1, i.e., it is 2, program control advances from step S81 to step S82, where data in the third byte is stored in the buffer. At step S83, the number of received bytes is set to 1 (it is not set to 0 because it must correspond with a running status). At step S84, a display process that will be described later is performed, and program control returns to step S70. The running status is one of the MIDI data transmission systems. A MIDI message normally consists of three bytes. To sequentially transmit, for example, two note-data sets, when the statuses (first byte) of both note-data sets are the same, the first byte of the note data that is to be transmitted second can be omitted. Such a transmission system is called the running status.

Figure 20:
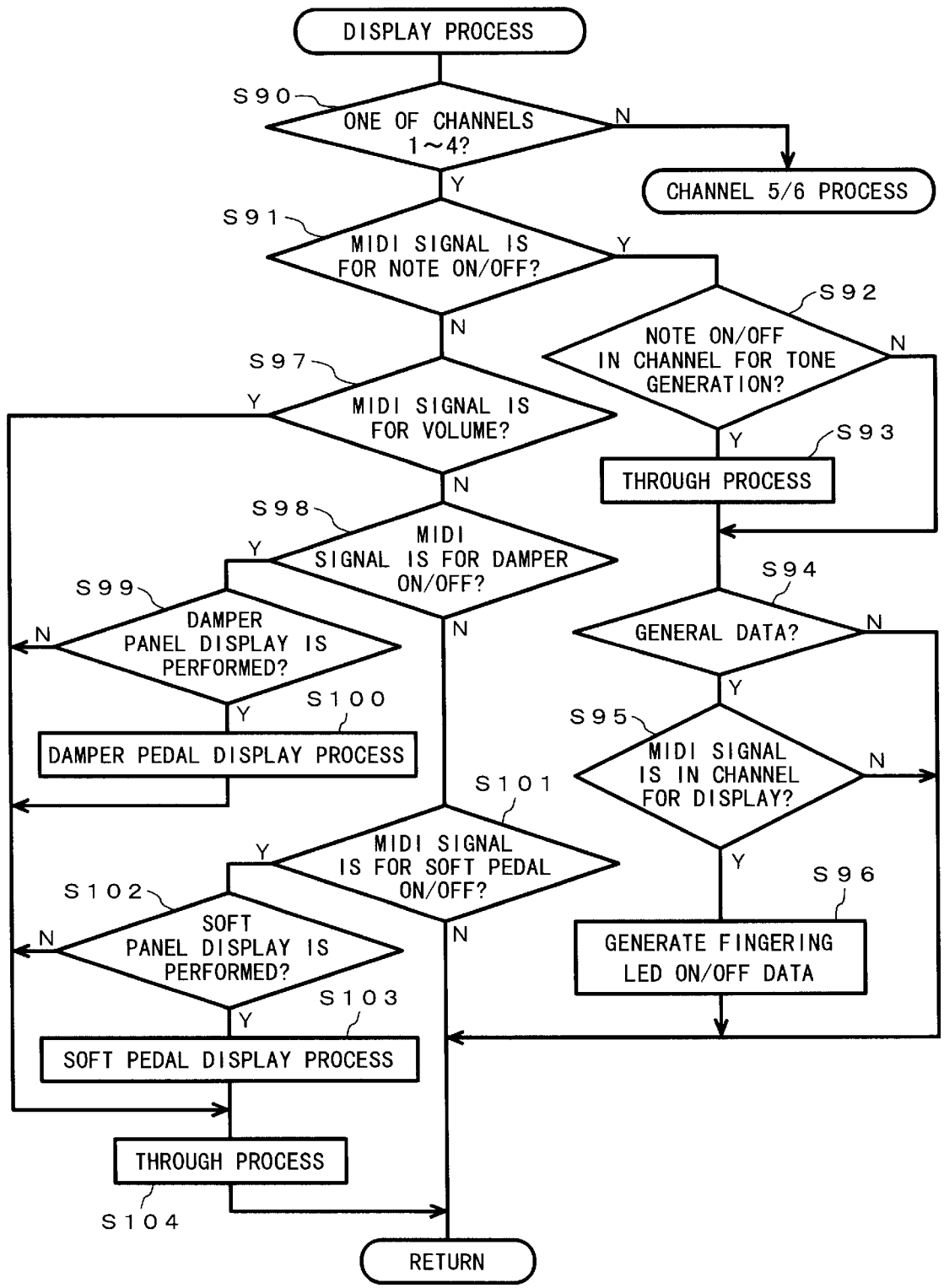
FIG. 20 is a detailed flowchart for a display process at step S84 in FIG. 19.

FIG. 20 is a detailed flowchart for the display process (S84) in FIG. 19. At step S90, a check is performed to determine whether or not the MIDI signal channel is any one of the channel 1 through channel 4. When the result is negative (i.e., the channel in question is the channel 5 or 6), program control moves to a channel 5 or 6 process (FIG. 21) that will be described later. When the result is affirmative, program control goes to step S91. At step S91, a check is performed to determine whether or not a MIDI signal is a note ON/OFF signal (representing a key on or key off). When the result is affirmative, program control advances to step S92.

At step S92, based both on the determination as to whether play data is general data or special data, and on a current mode value, the table shown in FIG. 6 or 7 is examined to determine whether or not a MIDI signal that is being processed belongs to a channel (track) used for tone generation. When, for example, the play data are special and the mode value is 2, and the channel 3 is used, the columns in FIG. 6 for mode 2 and track 3 are referred to determine that the data is to be processed for tone generation. When the result of the decision at step S92 is affirmative, program control advances to step S93 where the MIDI signal is stored in the transmission buffer, and the through process is performed to activate the MIDI transmission operation. Through this process, the MIDI signal is transmitted to the MIDI output terminals 45 and the electronic musical instrument unit 3, and tone generation is performed. The through process is skipped for data that is used only for a display and not for tone generation, so that such data is not output externally.

At step S94, a check is performed to determine whether play data is general data. If the result is negative, that is, the play data is special data, channels 1 through 4 are not used for display, and the process is terminated. When the play data is general data, program control advances to step S95, the table in FIG. 7 is examined to determine whether or not the MIDI signal is in a channel used for display. When the MIDI signal should be displayed, program control goes to step S96 where the ON/OFF data for the note-on display LED is updated. In other words, for the note-ON data, display data for the note-on display LED corresponding to a note number is set to ON, while for the note-OFF data, the display data is set to OFF. When the play data is general data, therefore, only the note-on position is displayed based on the note-ON/OFF data, and a display for fingering (positions of hands) is not performed.

When the result of the decision at step S91 is negative, program control goes to step S97, where a check is performed to determine whether or not the MIDI signal is a volume message. When the result is affirmative, program control moves to step S104, and the same through process as that at step S93 is performed. When the result is negative, program control goes to step S98. At step S98, a check is performed to determine whether the MIDI signal is a damper ON/OFF message. When the result is affirmative, program control advances to step S99. Then, a check is performed to determine whether or not the MIDI signal indicates a mode and a data attribute according to which the damper pedal operation display should be performed, i.e., whether or not play data is general data and the mode value is other than mode 5. When the result is affirmative, program control moves to step S100. In consonance with the damper ON/OFF message, the damper pedal operation display data is set to ON/OFF, and program control then moves to step S104.

At step S101, a check is performed to determine whether or not the MIDI signal is a soft pedal ON/OFF message. When the result is affirmative, program control advances to step S102 where a check is performed to determine whether or not the mode value indicates a mode for a soft pedal operation display, i.e., whether or not play data is general data and a mode value is other than mode 5. When the result is affirmative, at step S103, in consonance with the soft pedal ON/OFF message, the soft pedal operation display data is set to ON/OFF, and program control thereafter moves to step Si 04.

Figure 21:
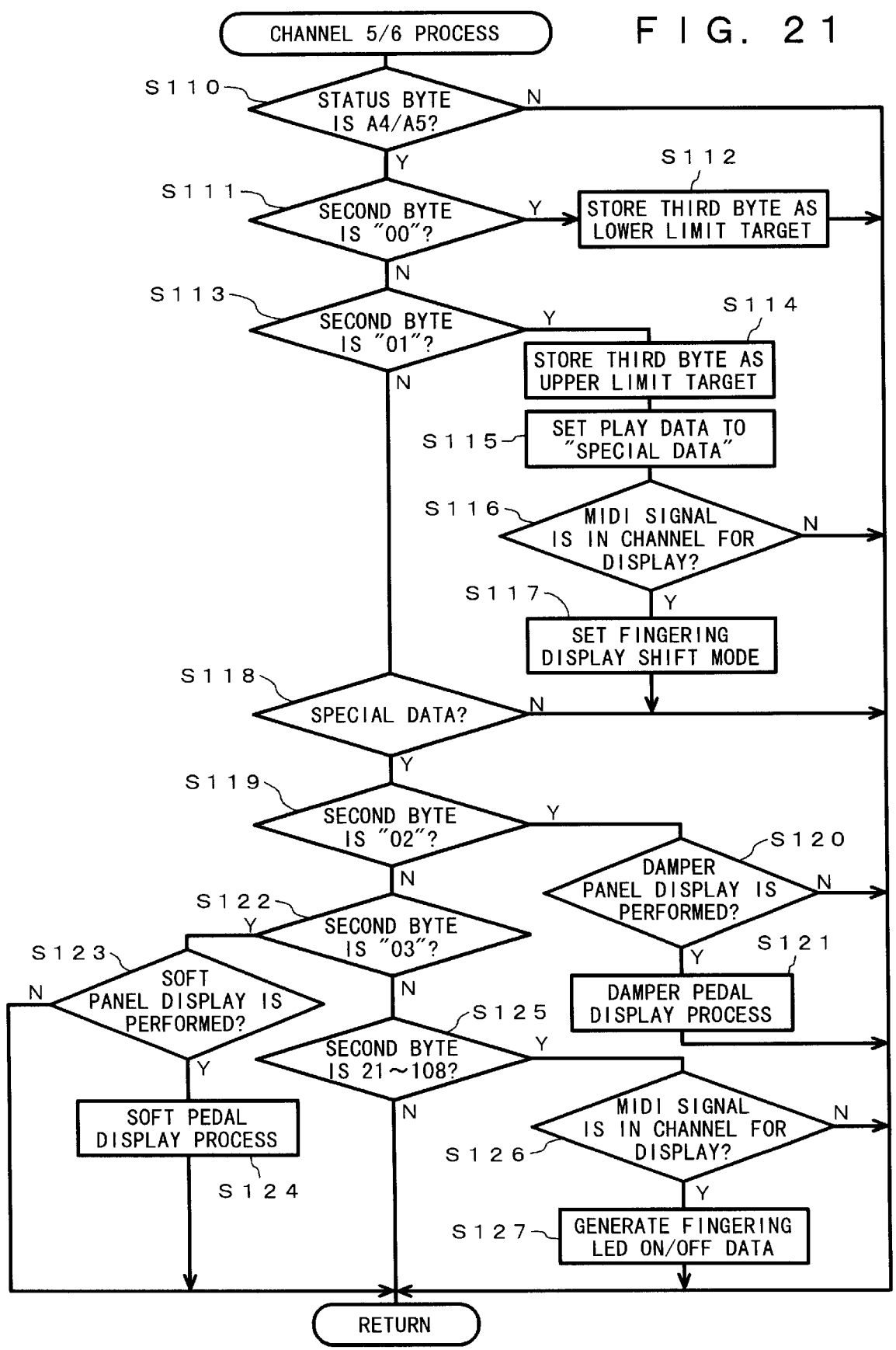
FIG. 21 is a flowchart for a 5 and 6 channel process shown in FIG. 20.

FIG. 21 is a flowchart for the channel 5 and 6 process to which program control moves when the decision result at step S90 is negative. At step S10, a check is performed to determine whether the status byte is A4 or A5 which is a polyphonic key pressure message for MIDI channel 5 or 6 where the display data is stored. When the result is affirmative, program control goes to step S111. When the result is negative, the process is terminated in this embodiment. However, to play correctly even when the fifth and the sixth channels are used for general data, the through process may be performed for the MIDI signal when the result is negative. At step S111, a check is performed to determine whether or not the second byte is "00". When the result is affirmative, program control moves to step S112, and the fingering lower limit note number data of the third byte is stored as a fingering lower limit target value.

At step S113, a check is performed to determine whether the second byte is "01". When the result is affirmative, program control moves to step S114, and the fingering upper limit note number data of the third byte is stored as the fingering upper limit target value. At step S115, the type of play data is set to "special data". Since the second byte of a polyphonic key pressure message indicates a note number, and in a standard piano, each key is assigned a note number of "21" or greater numeral, it is ascertained that this data is special data which includes note-on display data, if the second byte of the message is "01".

At step S116, the table in FIG. 6 is examined to determine whether or not the data in the channel should be displayed.

When the result is affirmative, program control advances to step S117, where a fingering display shift mode is set. The process is thereafter terminated. The quantity of the fingering display shift is 0 when the current upper limit value and the current lower limit value of the display for fingering (positions of both hands on the keyboard) respectively match the target values stored at S112 and S114. When the current values are smaller than the target values (shifted to the left), +1 is set as quantity of the fingering display shift. When the current values are greater than the target values (shifted to the right), on the other hand, −1 is set as quantity of the fingering display shift. The upper and the lower target limit values are generally used as a pair. When only the lower limit value is changed, for example, another data for the upper target limit value that is unchanged from a preceding value is received, and the processes at steps S115 to S117 are performed.

At step S118, a check is performed to determine whether or not the play data is the special data. When the result is negative, the process is terminated. When the play data is special data, program control advances to step S119 and a check is performed to determine whether or not the second byte is "02". When the second byte is "02", program control moves to step S120. A check is then performed to determine whether or not the mode is set to a mode in which a damper pedal operation should be displayed. When the result is affirmative, program control moves to step S121, where the same display process is performed for the damper pedal operation display as that at step S100 (FIG. 20). The process is thereafter terminated. At step S122, a check is performed to determine whether or not the second byte is "03". When the second byte is "03", program control moves to step S123, and a check is performed to determine whether or not the mode is one in which the soft pedal operation should be displayed. When the soft pedal oration should be displayed, program control goes to step S124, and the same display process is performed for the soft pedal operation display as that at step S103 (FIG. 20).

At step S125, a check is performed to determine whether the second byte is any one of "21" to "108" (within the note number range of a standard piano with 88 keys, as was previously described). When the result is affirmative, program control moves to step S126 where a check is performed to determine whether or not the message is for a channel used for display. When the result at step s126 is affirmative, program control moves to step S127, and the same LED ON/OFF data generation process is performed as that at step S96 (FIG. 20).

FIG. 22 is a detailed flowchart for a fingering display data preparation (or updating) process (S23) in FIG. 12. At step S130, whether a predetermined time (e.g, several tens to several hundreds of milliseconds) has elapsed is determined by examining the value held by the fingering display timer counter to determine whether it is greater than the predetermined value. When the result is negative, the process is terminated. When the result is affirmative, the counter is cleared and program control advances to step S131. At steps S131 through S138, the upper limit fingering mode process is performed for the left hand. At step S131, a check is performed to determine whether or not the left upper limit fingering mode value is "0". When the result is negative, program control moves to step S132 where all of the fingering display for the left hand is set to OFF. At step S1 33, a check is performed to determine whether or not the left upper limit fingering mode value is "1". When the result is affirmative, program control goes to step S135, where the current upper limit value for the left hand fingering display is incremented by one. On the contrary, when the mode value is not "1", i.e., it is "−1", program control goes to step S134 where the current limit value is decremented by one.

At step S136, LED display data that fall within a range between the updated upper limit value and the current lower limit value are set to ON. At step S137, a check is performed to determine whether or not the current upper limit value, which has been updated, of the left hand equals the target value (which has been determined in the process in FIG. 21). when the result is affirmative, program control goes to step S138, and the fingering mode for the upper limit value of the left hand is set to 0.

At steps S139, S140 and S141, the same process as that performed at steps S131 to S138 is performed for the left hand lower limit value, the right hand upper limit value and the right hand lower limit value, respectively, and the respective fingering display data are updated. An activation period (time at step S130) for the fingering display data preparation process is appropriately set, so that the fingering display is not moved intermittently but smoothly, in the same manner as the player's hands are moved in the playing operation.

FIG. 9 is a front view of a second embodiment of the guide display device 9 according to the present invention. In this example, note-on display LEDs in the upper row (row A) of the guide display device shown in FIG. 5 for the first embodiment are omitted, and two rows of LEDs are provided. LEDs 70 and 73 at note-on positions may be blinked, as with the previously described display method for the fingering display for the left and the right hands, or different colors and luminances, from those used for the other displays, may be used for the LEDs to improve their discernibleness. In this embodiment, pedal LEDs 76 and 77 are individually located at positions where there are no black keys to provide information for only one of the pedals, or a two-color LED is used to display two types of information by using different light emission colors. At least two LEDs that emit lights different each other in color maybe provided at the positions where there are no black keys to provide information concerning the two kinds of pedals.

FIG. 10 is a front view of a third embodiment of the guide display device 9 according to the present invention. In this embodiment, the locations of the LEDs in the first row (row A) in the first embodiment are shifted vertically to correspond to the positions of the black keys and the white keys, so that the LEDs are arranged in four rows. Also, the light emissions of a black key LED 81 and a white key LED 80 may be different in color. Thus, the discernibleness is enhanced. In the first through the third embodiments, for example, the effective luminance can be adjusted by the blinking of an LED at a high frequency or by controlling the time-ratio of the light emission over a period of time.

The embodiments of the present invention have been described, however, in addition to them, the following modifications can be provided. Although, in the embodiments, a structure is disclosed whereby a display circuit is added to a silence or hybrid piano, the same structure can be used when the present invention is applied to an ordinary electronic piano or to other keyboard musical instruments. For example, the guide controller 8, the electronic musical instrument unit 3 and the MIDI sequencer 2 may be integrated so that they can be controlled by a single CPU. When the guide display device is to be added to a conventional acoustic piano, only the guide controller 8, the guide display device 9 and the guide panel 10 are need to be added.

Although the LED is used as a display element, any other type of display element, such as a liquid crystal, a fluorescent display tube, a lamp, or an EL element, may be used. Although the display device with a two-row or a four-row structure is disclosed, a display device with a single row structure can display the fingering positions of the right and left hands independently by using two-color LEDs. In addition, although the upper row is used for the note-on position display, the note-on position may be displayed on the middle row or the lower row.

In the embodiments mentioned above, fingering data has been prepared in advance as play data. Since fingering data is independent of note-on instruction data, a display timing can be determined in consonance with actual movement of the player's hand. Since the positions of the hands on the keyboard are displayed prior to note-on times in the play data, the player may be able to move smoothly his hands. For a demonstration performance, for example, the fingering data and the note-on instruction data can be employed for an illuminated display or a moving picture that is consonant with the mood or genre of the music, instead of displaying the note-on positions and the fingering.

When the play data is a special data, the same pedal play information may be entered in tracks (channels) 3 and 4 so that the pedals are correctly operated by using another tone generator. The pedal display information in tracks 5 and 6 may be omitted, and in addition to the general data, the play data in tracks 3 and 4 may be used for pedal display.

Industrial Applicability

As is described above, according to the present invention, an indicator is provided for each key of various types of keyboard musical instruments, such as acoustic pianos and electronic pianos. The indicators for a keyboard range to be covered by the fingers of the player are set to display states (for example, lighting up) different from those of the remaining indicators. Thus, the player can intuitively and immediately perceive the range that is to be covered with his fingers, and can easily move his hands to match the range. Thus, the player moves his hand to a position displayed on the keyboard and uses his finger that is closest to the indicated key position to depress the key closest to that finger. In this manner, the correct fingering system can be learned easily. And since the positions of the right and left hands are displayed independently, even when the both hands are brought near each other in the course of playing, the positions of the hands and the fingers to be used for notes-on can be clearly identified. Further, since the note-on display and the fingering display are separate, the fingering display can be shifted slightly before the note-on time. As a result, a player is motivated to realize more natural and smooth movements of the hands by the display of fingering according to the present invention.

We claim:

1. A keyboard musical instrument comprising:

range display means including a plurality of range display elements, which are provided to correspond to each key on a keyboard, for displaying a keyboard position for a hand to be covered by one hand of a player during a performance;

means for extracting display data included in play data; and drive means for employing the display data to change a display mode for some of the range display elements which correspond to the keyboard position for a hand so that the display mode is different from those of the remaining range display elements.

2. A keyboard musical instrument according to claim 1, wherein the range display means includes right hand range display means, for displaying a keyboard position for a hand to be covered by the right hand of the player, and left hand range display means, for displaying a keyboard position for a hand to be covered by the left hand of the player.

3. A keyboard musical instrument according to claim 1, further comprising a plurality of note-on position display elements provided to correspond to each key on a keyboard, note-on position display means for urging note-on position display elements, which correspond to a key to be depressed during the performance, to enter a display mode differing from that of the remaining note-on position display elements based on the display data.

4. A keyboard musical instrument according to claim 2, wherein the range display means consists of a plurality of two-color light emission devices arranged in a single row, and being so driven that the keyboard position for a hand to be covered by the right hand and the keyboard position for a hand to be covered by the left hand are displayed in different colors.

5. A keyboard musical instrument according to claim 1, wherein the range display elements are also used for displaying note-on display positions, and one of the range display elements designated which corresponds to a key to be depressed for the performance is energized so that the display mode thereof is further different from those of the remaining range display elements which correspond to the position for a hand.

6. A keyboard musical instrument according to claim 2, wherein the right hand range display means and the left hand range display means are arranged in different rows.

7. A keyboard musical instrument according to claim 3, wherein display elements of the right hand range display means, of the left hand range display means and of the note-on position display means are respectively arranged in different rows, respectively.

8. A keyboard musical instrument according to claim 7, wherein the display elements of the note-on position display means are separated into two rows for white keys and for black keys.

9. A keyboard musical instrument according to claim 2, wherein the display elements of the right hand range display means have a display color different from that of the display elements of the left hand range display means.

10. A keyboard musical instrument according to claim 2, wherein a pair of display elements for the right hand range display means and left hand range display means are positioned in alignment with each corresponding key over the rear portion of the keyboard.

11. A keyboard musical instrument according to claim 3, wherein three display elements for the right hand range display means, the left hand range display means and the note-on position display means are positioned in alignment with each corresponding key over the rear portion of the keyboard.

12. A keyboard musical instrument according to claim 1, wherein during a performance, when a display position for the keyboard position for a hand to be covered by the hand of the player differs from a preceding position, the keyboard position for a hand display is shifted from the preceding display position to a next display position at a velocity anticipated by the player.

13. A keyboard musical instrument according to claim 12, wherein a shift from the preceding display position to the next display position is performed earlier than an anticipated note-on time at the next display position for the hand of the player.

14. A keyboard musical instrument according to claim 1, further comprising:

pedal operation display means consisting of at least one of pedal operation display elements for displaying pedal operation information;

means for extracting a pedal operation display information out of the play data and second drive means for driving the pedal operation display elements in consonance with the pedal operation display information.

15. A keyboard musical instrument according to claim 14, wherein the pedal operation display element is arranged to correspond to position where two white keys are directly adjacent to each other on the keyboard.

16. A keyboard musical instrument according to claim 1, further comprising:

tone signal generation means for generating a tone signal based on the play data; and mode control means for controlling ON/OFF states for one of said display element and tone generation for each channel of the play data.

17. A keyboard musical instrument according to claim 16, wherein the display data employs a specific channel of play MIDI data, and is stored using a MIDI message.

18. A keyboard musical instrument according to claim 1, wherein the position for a hand is defined by a fingering upper limit position and a fingering lower limit position.

19. A keyboard musical instrument according to claim 1, wherein the position for a hand is defined by about eight consecutive keys.

20. A keyboard musical instrument comprising:

range display means including a plurality of range display elements, which are provided to correspond to each key on a keyboard, for displaying a plurality of distinct positions for a hand to be covered by one hand of a player during a performance;

means for extracting display data included in play data; and drive means for employing the display data to change a display mode for some of the range display elements which correspond to a distinct one of the plurality of distinct positions for a hand so that the display mode is different from those of the remaining range display elements.

* * * * *